US006374011B1

United States Patent
Wagoner et al.

(10) Patent No.: US 6,374,011 B1
(45) Date of Patent: Apr. 16, 2002

(54) BLOCKLESS TECHNIQUES FOR SIMULTANEOUS POLISHING OF MULTIPLE FIBER OPTICS

(75) Inventors: Gregory A. Wagoner, Watervliet; Kevin J. McCallion, Albany; Kim R. Labarge, Schenectady, all of NY (US)

(73) Assignee: Molecular OptoElectronics Corporation, Watervliet, NY (US)

( * ) Notice: Subject to any disclaimer, the term of this patent is extended or adjusted under 35 U.S.C. 154(b) by 0 days.

(21) Appl. No.: 09/139,832

(22) Filed: Aug. 25, 1998

(51) Int. Cl.$^7$ .............. G02B 6/26; G02B 6/36; B24B 1/00
(52) U.S. Cl. .............. 385/30; 385/50; 385/85; 385/134; 451/41; 451/42; 451/277
(58) Field of Search ............... 385/30, 37, 50, 385/134, 83, 85, 135, 137, 140; 451/41, 42, 11, 277, 278

(56) References Cited

U.S. PATENT DOCUMENTS

| | | | |
|---|---|---|---|
| 4,343,532 A | * 8/1982 | Palmer | |
| 4,469,544 A | 9/1984 | Goodman | 156/345 |
| 4,469,554 A | 9/1984 | Turner | 156/657 |
| 4,630,884 A | * 12/1986 | Jubinski | |
| 4,630,890 A | 12/1986 | Ashkin et al. | 350/96.3 |
| 4,704,151 A | 11/1987 | Keck | 65/4.1 |
| 4,773,924 A | 9/1988 | Berkey | 65/3.11 |
| 5,078,465 A | * 1/1992 | Dahlgren | 385/50 |
| 5,136,818 A | * 8/1992 | Bramson | |
| 5,290,398 A | 3/1994 | Feldman et al. | 156/651 |
| 5,623,567 A | * 4/1997 | Barberio et al. | 385/30 |
| 5,781,675 A | 7/1998 | Tseng et al. | 385/30 |
| 5,966,493 A | 10/1999 | Wagoner et al. | 385/140 |

FOREIGN PATENT DOCUMENTS

DE  30 36 868  * 5/1982
EP  0 124 485  * 7/1984

OTHER PUBLICATIONS

Birks, Timothy A. and Li, Youwei W., "The Shape of Fiber Tapers," *IEEE Journal of Lightwave Technology* 10 (4), pp. 432–438 (Apr. 4, 1992).

Diez A. et al., "Cynlindrical Metal–Coated Optical Fibre Devices for Filters and Sensors," *Electronic Letters* 32 (15), pp. 1390–1392 (Jul. 18, 1996).

Kenny, R.P. et al., "Control of Optical Fibre Taper Shape," *Electronic Letters* 27 (18), pp. 1654–1656 (Aug. 28, 1991).

Love, J.D. et al., "Quantifying Loss Minimisation in Single–Mode Fibre Tapers," *Electronic Letters* 22 (17) pp. 912–914 (Aug. 14, 1986).

Morozov Val et al., "Fused Fiber Optic Variable Attenuator," *OFC 2000, 25$^{th}$ Annual Optical Fiber Communications Conference*, pp. 22–24 (Mar. 10, 2000).

R.P. Pan et al., "Voltage–Controlled Optical Fiber Coupler Using a Layer of Low–Refractive Index Liquid Crystal with Positive Dielectric Anisotropy," *Jpn. J. Appl. Phys.* 34, Part 1, 6410–6415 (1995).

(List continued on next page.)

Primary Examiner—Hemang Sanghavi
(74) Attorney, Agent, or Firm—Kevin P. Radigan, Esq.; Heslin Rothenberg Farley & Mesiti P.C.

(57) ABSTRACT

A method and apparatus for polishing the side surfaces of fiber optics destined for devices in which the evanescent optical field of the optics must be accessed through polished side surfaces thereof. A plurality of fiber optics are temporarily affixed to a rounded surface, for polishing of the outer-facing surfaces thereof. In one embodiment, fiber optics are positioned across a cylindrical lens, perpendicular to a longitudinal axis thereof, and are temporarily affixed thereto using a wax. Polishing commences, which can be monitored for progress using visual or optical power measurements. The fiber optics are thereafter removed from the lens, ready for installation into their respective devices.

11 Claims, 3 Drawing Sheets

OTHER PUBLICATIONS

M. J. F. Digonnet et al., "Measurement of the Core Proximity in Polished Fiber Substrates and Couplers," *Optics Letters* 10, 463–465 (1985).

O.G. Leminger & R. Zengerle, "Determination of Single–Mode Fiber Coupler Design Parameters from Loss Measurements," *IEEE Journal of Lightwave Technology* LT–3, 864–867 (1985).

M.H. Cordaro et al., "Precision Fabrication of D–Shaped Single–Mode Optical Fibers by In Situ Monitoring," *IEEE Journal of Lightwave Technology* 12, 1524–1531 (1994).

J. Gowar, *Optical Communication Systems*, ch. 3, 58–77 (2d Ed. 1993).

U.T. Mueller–Westerhoff et al., "The Synthesis of Dithiolene Dyes with Strong Near–IR Absorption", *Tetrahedron* 47, 909–932 (1991).

C.D. Hussey & J.D. Minelly, "Optically Fibre Polishing with a Motor–Driven Polishing Wheel", *Electronic Letters* 24, 805 (1988).

O. Parriaux et al., "Distributed coupling on polished single–mode optical fibers", *Applied Optics* 20, 2420–2423 (1981).

\* cited by examiner

BLOCKLESS TECHNIQUES FOR SIMULTANEOUS POLISHING OF MULTIPLE FIBER OPTICS

CROSS-REFERENCE TO RELATED APPLICATIONS

This Application is related to U.S. patent application Ser. No. 09/026,755, filed Feb. 20, 1998, and entitled "FIBER OPTIC ATTENUATORS AND ATTENUATION SYSTEMS;" and U.S. patent application Ser. No. 09/026,755, filed concurrently herewith, and entitled "DISPERSION CONTROLLED POLYMERS FOR BROADBAND FIBER OPTIC DEVICES;" and U.S. patent application Ser. No. 09/789,093, filed concurrently herewith, and entitled "BLOCKLESS FIBER OPTIC ATTENUATORS AND ATTENUATION SYSTEMS EMPLOYING DISPERSION CONTROLLED POLYMERS."

Each of these Applications is hereby incorporated by reference herein in its entirety.

TECHNICAL FIELD

The present invention relates to fiber optics, and in particular to techniques for polishing fiber optics toward their core to access the evanescent field of the optical energy transmitted therein.

BACKGROUND OF THE INVENTION

Fiber optics are becoming well known and used transmission media, as they can carry high bandwidth information using low-power optical energy. Like their well known electrically conductive counterparts (wires, cables, etc.), fiber optic circuits must also employ devices such as filters, modulators, amplifiers and attenuators. Techniques have been proposed by the present assignee, among others, for accessing the evanescent field of the optical energy transmitted in a fiber optic to perform the requisite filtering, modulation, amplification, attenuation, etc. These techniques involve removing a portion of the cladding of the fiber optic, close to the core, thereby exposing the evanescent field thereof. Using various controllable refractive index materials, applied over the exposed surface, which interact with the evanescent field, the optical energy transmitted in the fiber can be filtered, modulated, amplified, attenuated, etc.

One exemplary approach for polishing the fiber and accessing the evanescent field is disclosed in the co-pending U.S. patent applications Ser. Nos. 08/786,033, and 08/785,871, entitled "Electro-Optic Compound Waveguide Modulator" and "Compound Optical Waveguide and Filter Applications Thereof," both commonly assigned with the present application, and incorporated herein by reference in their entirety. In those applications, a grooved radius block is employed within which an unpolished fiber is placed. The fiber is polished using the block as a surrounding support structure, and the block/polished fiber assembly as a whole forms part of the eventual device (e.g., filter, modulator, etc.).

More particularly, a supporting glass block is initially prepared with a narrow (typically 130 μm) channel cut with a constant radius of curvature. The optical fiber is stripped (i.e. any buffers removed), placed in the groove and permanently fixed therein with epoxy. The block-fiber assembly is then mounted to a polishing fixture, and both the block and fiber are simultaneously lapped and polished to approach/expose the core. This permits access to the evanescent optical field for processing (e.g., filtering modulation, amplification, attenuation, etc.).

There are several reasons for using this technique, including: (I) the need to mechanically support the fiber during the polishing process, and/or the subsequent device; and/or (ii) the need to maintain a large area planar coupling surface upon which to deposit an overlay material. This approach, although necessary for certain applications, especially for overlay waveguide coupling, has several limitations. Foremost of these is the difficulty of multiple fiber processing as a result of the inability to uniformly produce multiple grooves using standard cutting techniques. This limits the production rate of these devices, e.g., typically only one device can be processed per polishing fixture at a time. In addition, the glass block makes the device significantly larger, of much greater thermal mass (i.e., the block may operate as an undesirable thermal sink in a thermo-optic device), and more complicated to produce (i.e., both lapping and polishing steps are usually required).

In a concurrently-disclosed device, the support block is eliminated to improve performance, reduce the size and/or lower the cost of the device. (See the concurrently-filed, above-incorporated U.S. Patent Application entitled "Blockless Fiber Optic Attenuators and Attenuation Systems Employing Dispersion Controlled Polymers.") In that application, an attenuator is disclosed in which the polished fiber optic is suspended in the support structure and is only contacted by a thermo-optic material. The remaining surrounding material (e.g., air) is thermally insulative, which is a characteristic that cannot be obtained using the polished block approach discussed above.

What is required are improved techniques for processing fiber optics, without the performance, size, weight, quantity or cost constraints associated with the block techniques.

SUMMARY OF THE INVENTION

The shortcomings of the prior fiber polishing approaches are overcome by the present invention which in one aspect relates to a method for removing material from multiple fiber optics, including providing an at least partially rounded surface; temporarily affixing portions of the fiber optics to the surface; polishing material from the portions of the fiber optics; and removing the fiber optics from the surface.

The fibers may be temporarily affixed, side-by-side, onto the surface. Preferably, a cylindrical surface (e.g., lens) is used and the fiber optics are aligned perpendicular to a longitudinal axis of the cylindrical surface. The surface may also be leveled, at least along this axis, before polishing.

During polishing, the polishing depth can be periodically checked using an optical loss power measurement. This may include placing a material over the polished surface (e.g., oil); transmitting optical energy through the fiber at a known power; and optically measuring an amount of the optical energy lost to the oil.

A related apparatus is also disclosed for facilitating the polishing of multiple fiber optics, which includes a partially rounded surface on which the multiple fiber optics are temporarily affixed, for polishing.

The "blockless" processing techniques of the present invention provide benefits over the prior "block" techniques, including reduced size and weight (and therefore thermal mass), reduced cost, and the ability to simultaneously process multiple fibers.

BRIEF DESCRIPTION OF THE DRAWINGS

The subject matter which is regarded as the invention is particularly pointed out and distinctly claimed in the concluding portion of the specification. The invention, however, both as to organization and method of practice, together with further objects and advantages thereof, may best be understood by reference to the following detailed description of the preferred embodiment(s) and the accompanying drawings in which:

DETAILED DESCRIPTION OF THE PREFERRED EMBODIMENT(S)

Figure 1:
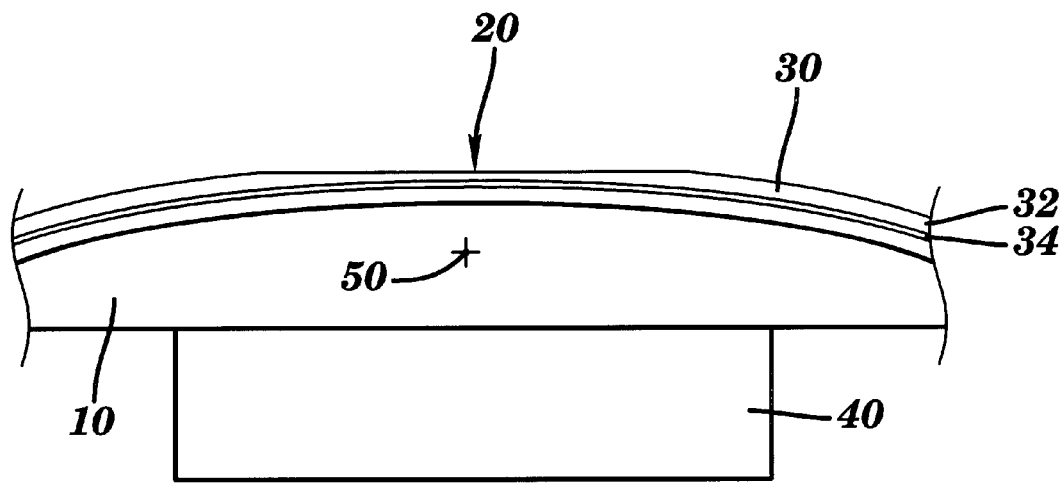
FIG. 1 is an enlarged, end view of a cylindrical lens over which a portion of a fiber optic is positioned for polishing in accordance with the present invention.

In accordance with the present invention, a technique for polishing fibers is provided in which the radius groove block discussed above is eliminated and replaced with a reusable rounded support surface 10 upon which fiber 30 is placed to be polished into its upward-facing surface 20. (FIG. 1). Typically, cylindrical, plano-convex glass lenses can be used because of their surface area, uniformity, smoothness (<200 nm) and hardness. The uniformity (<0.5 $\mu$m) and area of the cylindrical surface allows multiple fibers 30' to be mounted and processed simultaneously (FIG. 2), typically 3–16 fibers. Investigation has shown that the process disclosed herein works for a variety of optical fiber types, including 250 and 900 $\mu$m buffered standard single-mode fibers, used in telecommunications, including Corning SMF-28.

Summarizing the techniques disclosed herein (which are discussed in greater detail below with respect to the flow diagram of FIG. 4), portions of the fibers are initially stripped (i.e., any buffer layers are removed) and are placed directly on an optically-clean lens 10 (which itself is affixed to mounting chuck 40). The fibers are positioned perpendicular to the longitudinal cylinder axis 50, and held in place using weights, which are attached to the fiber leads and suspended to apply a nominally tangential tension. Once the desired number of fibers 30' have been mounted, usually side-by-side for added alignment benefits (FIG. 2), a temporary bonding medium is applied to hold the fibers in place during processing (typically a wax). Once the bonding medium has fixed, the weights are removed and the fiber/lens/chuck assembly is mounted to a polishing fixture, and polished at their upward facing surfaces (e.g., 20). To ensure uniform processing across all fibers 30', the cylindrical surface should be leveled at least along axis 50 with the polishing fixture, which is typically achieved with an angular adjustment plate.

Because the glass block has been eliminated, the only surfaces which will be polished are those of the fibers themselves (the bonding agent is typically much softer and removed at a rate determined by the processing of the fibers). This permits processing using a single polishing step, thereby eliminating the possibility of cross-contamination from lapping abrasives. Further, the entire polishing procedure occurs much more rapidly, and can be completed in as little time as a few minutes. The fibers may also be visually or optically tested during processing (e.g. for polishing depth, coupling, excess loss or polarization dependent loss). Once processing is completed, the fibers can be separated from the lens by removing the temporary bonding medium (e.g. melting the wax and/or using solvents), and lifting them from the surface. Because only the fibers themselves have been polished, the lens can be cleaned and reused indefinitely.

Figure 3:
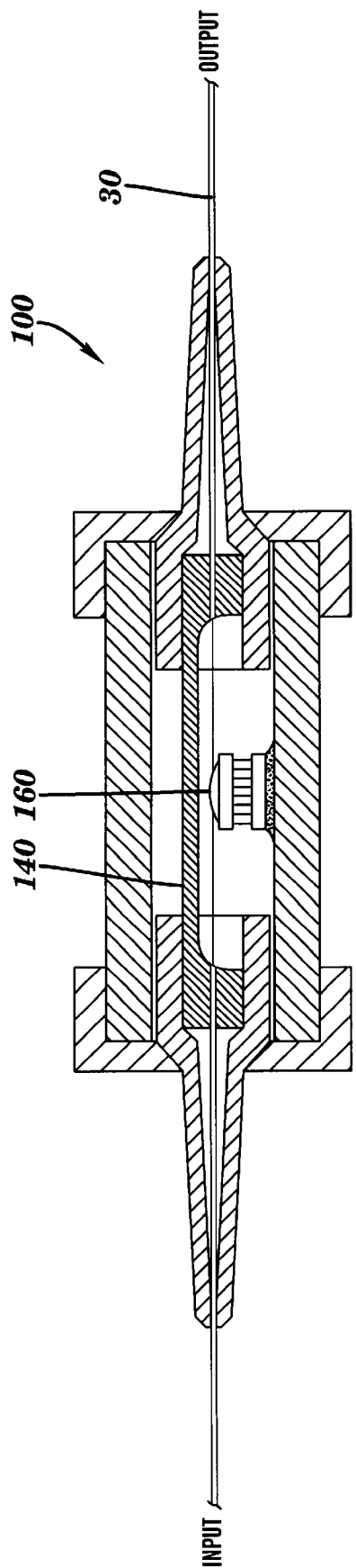
FIG. 3 is a central cross-sectional view of an exemplary attenuation device within which a polished fiber can be suspended.

A polished fiber can then be suspended in a support structure such as that disclosed in the above-incorporated U.S. Patent Application entitled "Blockless Fiber Optic Attenuators and Attenuation Systems Employing Dispersion Controlled Polymers," a figure thereof reproduced herein as FIG. 3. Fiber 30 is suspended in a support structure 140 and contacted with a controllable thermo-optic material 160, forming the essential portions of attenuator 100. The suspension of the bare, polished fiber in a thermally insulative environment (e.g., air) allows for fast and efficient thermal control of material 160.

Figure 2:
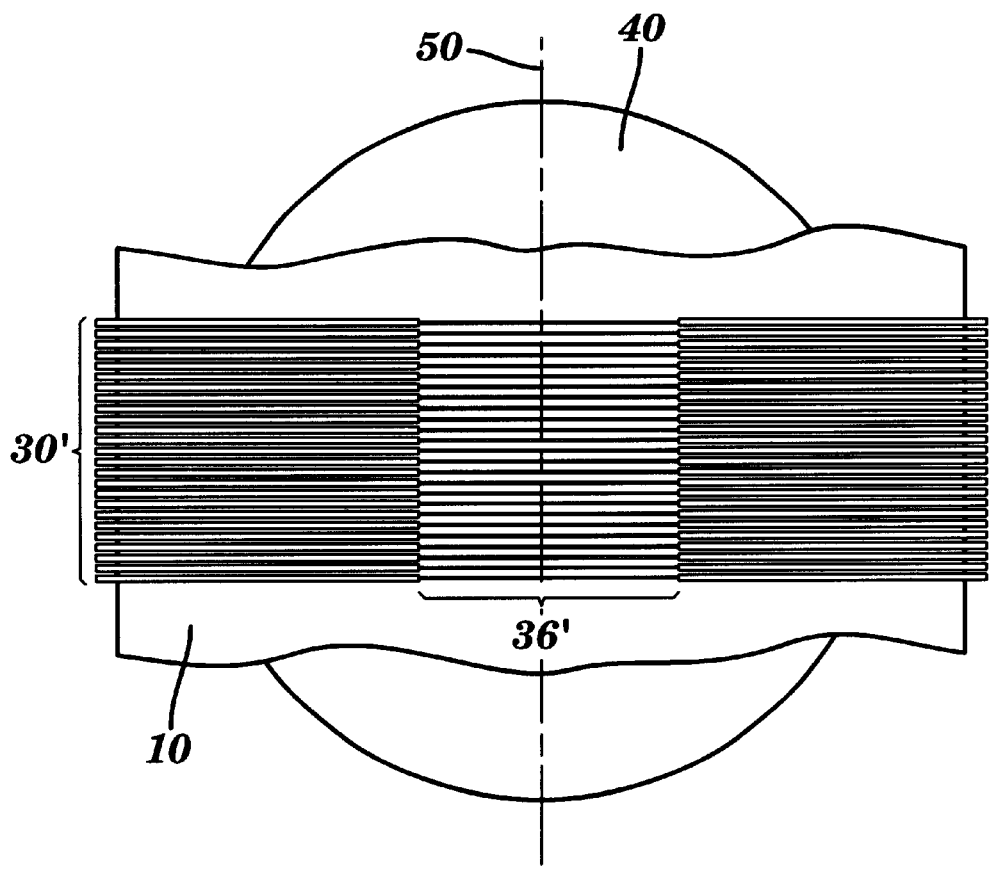
FIG. 2 is a top plan view of a cylindrical lens over which respective portions of multiple fiber optics are placed side-by-side, in accordance with the present invention.
Figure 4:
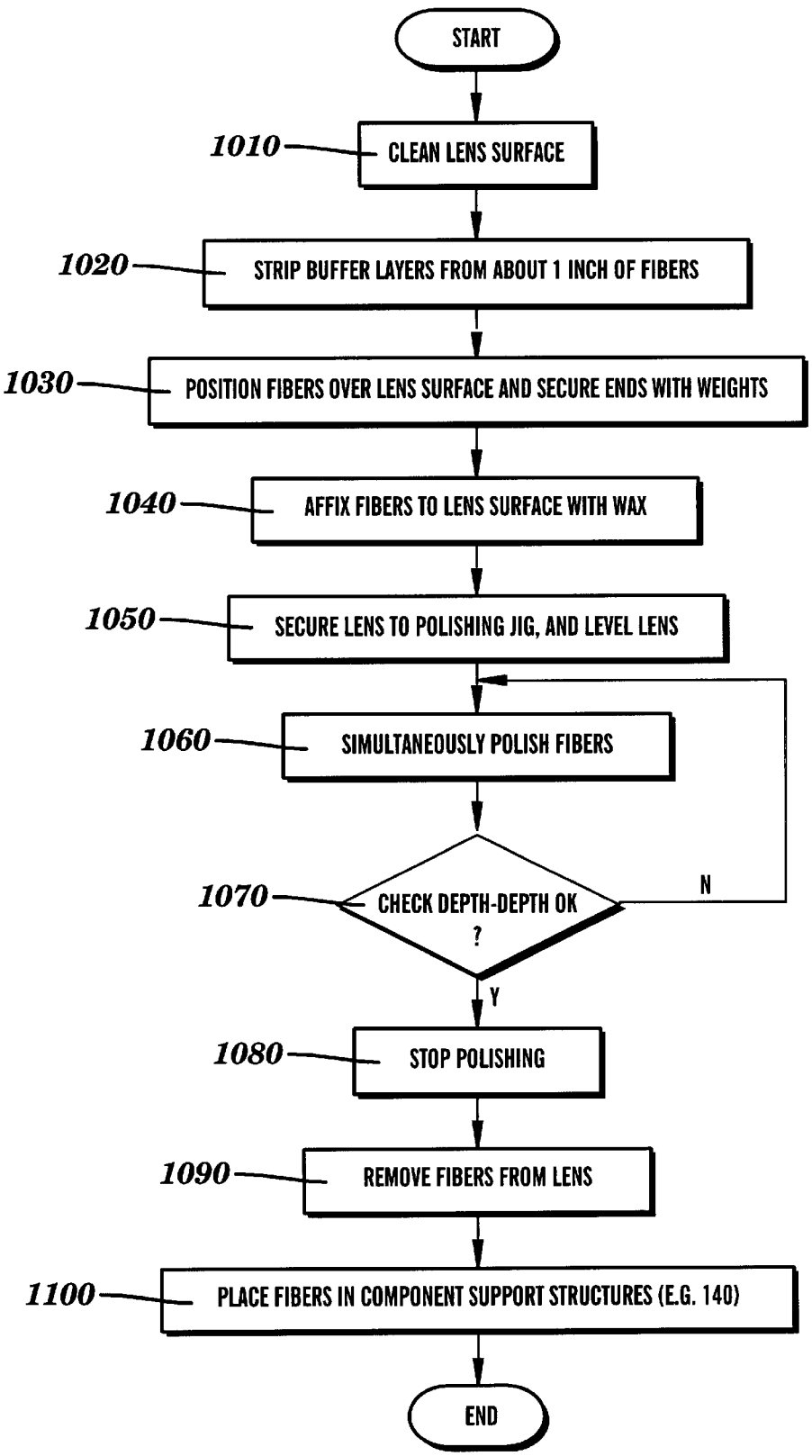
FIG. 4 is a process flow diagram illustrating an exemplary processing technique in accordance with the present invention.

With reference now to all figures, and particularly the process flow diagram of FIG. 4, an exemplary processing technique in accordance with the present invention is presented. An exemplary cylindrical lens 10 is provided (e.g., Edmund Scientific 150 mm PCX cylindrical lens D32,732), the surface of which is cleaned (Step 1010). Any buffer layers are stripped from the central one-inch portions 36' of the fibers 30' (Step 1020), but the cladding 32 and the core 34 remain. The pre-stripped fibers 30' are placed across the lens, with the stripped portions over the highest point of the radius of the lens, preferably side-by-side as shown in FIG. 2, the ends of which are then secured with weights (Step 1030).

A temporary mounting material (e.g. Universal Photonics PM0050 "Superhold" powder wax) is applied to the surface of the lens and on and around the fibers 30' (Step 1040). The wax is melted uniformly and allowed to cool, thereby temporarily affixing the fibers to the lens surface. The weights are removed and the lens is affixed to the polishing jig (Step 1050). When polishing multiple fibers placed side-by-side, it is important to level the lens at least along its axis 50 so that the fibers are uniformly polished to the same depth. The polishing jig is then placed on a polishing machine (e.g., Lapmaster 12 with J. H. Rhodes 58640466050 pad using Terres Rares 1306-38-3 cerium oxide polishing abrasive, 0.5 $\mu$m particle size) and polishing commences (Step 1060).

Polishing commences first through the wax, then through the outer cladding 32 to approach the core 34, thereby exposing an upwardly facing surface (e.g., 20) and therefore the evanescent field of the optical energy to be transmitted in the fibers.

It should be noted that this technique is an improvement over the prior approaches, wherein an additional lapping step is usually needed because of the surrounding glass block within which the fibers are placed. In the present invention, the fibers are accessed directly along the top surface of the lens, and no additional lapping step is needed for a surrounding block.

To determine the proper polishing depth, microscopes and/or optical verification can be used. Optical loss (coupling strength) can be measured by coating the exposed surfaces of the fibers with a high-index oil (e.g., Cargille Labs Oil, $n_D$=1.600), transmitting through the fibers an optical signal of known power, measuring a resultant optical power transmitted through the fibers and therefore the amount of power lost to the oil. Typically, a 90% coupling strength is required, therefore, a 90% loss factor is required. The procedure for measuring the proper polishing depth is disclosed more particularly in the paper entitled "Measurement of the Core Proximity in Polished Fiber Substrates and Couplers," Optics Letters, Vol. 10, No. 9 (September 1985), pp. 463–465.

This optical loss, polishing depth test is represented by Step 1070 and the return to Step 1060 in FIG. 4, if the proper polishing depth is not yet reached.

Once the proper polishing depth is reached, polishing ceases (Step 1080), the lens is removed from the polishing jig, and the fibers are removed from the lens by removing the adherent wax with heat and/or solvents (Step 1090). The polished portions of the fibers are now ready to be suspended in a support structure such as structure 140 shown in FIG. 3, for attenuator 100 (Step 1100).

While the invention has been particularly shown and described with reference to preferred embodiment(s) thereof, it will be understood by those skilled in the art that various changes in form and details may be made therein without departing from the spirit and scope of the invention.

What is claimed is:

1. A method for removing material from a plurality of fiber optics, comprising:
   providing an at least partially rounded and smooth surface;
   temporarily affixing respective portions of the fiber optics over the top of the smooth surface;
   simultaneously polishing material from the respective portions of the fiber optics; and
   removing the fiber optics from the surface.

2. The method of claim 1, wherein the temporarily affixing includes:
   temporarily affixing the plurality of fiber optics side-by-side on the surface.

3. The method of claim 2, wherein the at least partially rounded surface comprises a cylindrical surface, and the temporarily affixing includes:
   temporarily affixing the plurality of fiber optics side-by-side on the surface substantially perpendicular to a longitudinal axis of the cylindrical surface.

4. The method of claim 3, further comprising:
   leveling the cylindrical surface at least along its longitudinal axis prior to said polishing to ensure substantial uniform polishing of the plurality of fiber optics.

5. The method of claim 1, wherein the at least partially rounded surface comprises a cylindrical surface.

6. The method of claim 1, further comprising:
   checking a polishing depth of at least one of said fibers using an optical loss measurement prior to said removing.

7. The method of claim 6, wherein said checking includes:
   applying a material over a polished surface of the at least one fiber;
   transmitting optical energy through the at least one fiber; and
   optically measuring an amount of optical energy lost through said material.

8. The method of claim 1, wherein the temporarily affixing includes:
   temporarily affixing the fibers with a wax while the fibers are temporarily held in place on the surface; and
   wherein the removing includes:
   removing the wax.

9. A method for simultaneously removing material from a plurality of fiber optics, comprising:
   temporarily affixing the plurality of fiber optics over the top of a smooth cylindrical surface, and perpendicular to a longitudinal axis thereof;
   simultaneously polishing the material from the plurality of fiber optics; and
   removing the plurality of fiber optics from the cylindrical surface.

10. The method of claim 9, wherein the cylindrical surface comprises a glass lens.

11. The method of claim 9, further comprising:
   leveling the cylindrical surface at least along its longitudinal axis prior to said polishing to ensure substantially uniform polishing of the plurality of fiber optics.

* * * * *